United States Patent
Tandekar et al.

(10) Patent No.: US 12,317,117 B2
(45) Date of Patent: May 27, 2025

(54) CARRIER AGGREGATION BASED ON USER LOCATION AND USER PROFILE

(71) Applicant: DISH Wireless L.L.C., Englewood, CO (US)

(72) Inventors: Dilip Tandekar, Broadlands, VA (US); Amit Pathania, Great Falls, VA (US); Gurpreet Sohi, Parker, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 350 days.

(21) Appl. No.: 17/752,685

(22) Filed: May 24, 2022

(65) Prior Publication Data

US 2023/0388846 A1 Nov. 30, 2023

(51) Int. Cl.
*H04W 28/02* (2009.01)
(52) U.S. Cl.
CPC .............. *H04W 28/0226* (2013.01)
(58) Field of Classification Search
CPC ..... H04W 12/12; H04W 72/50; H04W 72/51; H04W 28/0226; H04L 5/0069; H04L 5/001
See application file for complete search history.

(56) References Cited

U.S. PATENT DOCUMENTS

| | | | |
|---|---|---|---|
| 8,537,718 B2 * | 9/2013 | Etemad | H04L 47/11 370/254 |
| 9,198,182 B1 | 11/2015 | Marupaduga et al. | |
| 10,129,889 B1 * | 11/2018 | Marupaduga | H04W 72/0453 |
| 2017/0238316 A1 * | 8/2017 | Li | H04W 72/0453 370/329 |
| 2018/0054281 A1 * | 2/2018 | Nammi | H04B 7/0626 |
| 2018/0070293 A1 * | 3/2018 | Venkataraman | H04W 72/0453 |
| 2019/0166603 A1 * | 5/2019 | Wang | H04B 7/0868 |
| 2020/0187212 A1 * | 6/2020 | Bellamkonda | H04W 24/10 |
| 2022/0394712 A1 * | 12/2022 | Shahi | H04W 24/02 |

FOREIGN PATENT DOCUMENTS

EP 4016913 A1 * 6/2022 ............. H04L 5/001

OTHER PUBLICATIONS

International Search Report and Written Opinion, mailed Oct. 25, 2023, for International Application No. PCT/US2023/023248. (18 pages).
Invitation to Pay Additional Fees and, Where Applicable, Protest Fee, mailed Sep. 4, 2023, for International App No. PCT/US2023/023248. (12 pages).

* cited by examiner

*Primary Examiner* — Cheikh T Ndiaye
(74) *Attorney, Agent, or Firm* — Seed IP Law Group LLP (57) ABSTRACT

A base station establishes a mobile communications network utilizing multiple component carriers. The base station receives one or both of location data and profile data associated with user equipment devices connected to the mobile communications network. The base station selects carrier aggregation schemes for each of the user equipment devices based on one or both of the location data and the profile data.

12 Claims, 4 Drawing Sheets

CARRIER AGGREGATION BASED ON USER LOCATION AND USER PROFILE

BACKGROUND

Technical Field

The present disclosure relates to mobile wireless communication systems, and more particularly relates to mobile communication systems that use carrier aggregation.

Description of the Related Art

Wireless mobile communication technology uses various standards and protocols to transmit data between a base station and user equipment (user equipment device). Wireless wide area network communication system standards and protocols can include, for example, the $3^{rd}$ Generation Partnership Project (3GPP).

Current 3GPP for 5G specifications support specific component carrier bandwidths such as 5 MHz, 10 MHz, 15, MHz or 20 MHz. Individual component carriers, however, to meet the International Mobile Telecommunications Advanced (IMT-Advanced) requirements for very high data rates, the concept of carrier aggregation has been introduced to support bandwidths larger than 20 MHz. Also, carrier aggregation helps wireless operators to increase their data rates over the chunks of spectrum they own, intraband or interband. Currently, the carrier aggregation concept in LTE allows up to 32 component carriers of the same frame structure to be aggregated such that the total bandwidth available to a mobile terminal is the sum of the bandwidths of the cells. The 5G New Radio (NR) allows carrier aggregation of up to 16 component carriers. As used herein, a component carrier may be referred to as a cell.

While carrier aggregation may provide various benefits, it can still be difficult to provide satisfying service to all user equipment devices. For example, simply providing carrier aggregation may not address the variations in user traffic in a communication system from moment to moment. Accordingly, in many circumstances individual user equipment devices may experience reduced data speeds from a particular base station. This can result in unsatisfied users.

BRIEF SUMMARY

Embodiments of the present disclosure provide, from a base station, a mobile communication network that dynamically selects carrier aggregation schemes for each of a plurality of user equipment devices based on current traffic characteristics in the mobile communication network. The base station selects, for each user equipment device, a respective carrier aggregation scheme that results in high spectral efficiency for the mobile communication network based on current traffic characteristics in the mobile network. The carrier aggregation scheme for a user equipment device indicates which of the component carriers supported by the base station will be made available to the user equipment device.

In one embodiment, the base station obtains location data for each user equipment device. The location data indicates the current location of the user equipment device. The base station selects, for each user equipment device, a carrier aggregation scheme based on the location of the user equipment device. The base station may select, for each user equipment device, a carrier aggregation scheme based on the locations of all of the user equipment devices currently connected to the mobile communication network.

In one embodiment, the base station obtains profile data for each user equipment device. The profile data for a user equipment device indicates uplink and downlink data rates needed by the user equipment device. The base station selects a carrier aggregation scheme for the user equipment device based on the profile data. The base station may select, for each user equipment device, a carrier aggregation scheme based on the profile data of all of the user equipment devices currently connected to the mobile communication network.

In one embodiment, the base station trains an analysis model for a machine learning process to select carrier aggregation schemes for all of the user equipment devices currently connected to the base station. The analysis model can select a carrier aggregation scheme based on either or both of the location data and the profile data associated with the user equipment devices connected to the base station. The result is a high spectral efficiency for the mobile communication network.

In one embodiment, a method includes supporting a plurality of component carriers with a first base station and establishing, with the first base station, a network connection with a first user equipment device. The method includes receiving, with the first base station, first location data indicating a location of the first user equipment device and selecting a first carrier aggregation scheme for the first user equipment device based on the first location data.

In one embodiment, a method includes supporting a plurality of component carriers with a first base station and establishing, with the first base station, a cellular connection with a first user equipment device. The method includes storing, with the first base station, first profile data indicating bandwidth needs of the user equipment device; and selecting a first carrier aggregation scheme for the first user equipment device based on the first profile data.

In one embodiment, a method includes storing training data. The training data includes historical profile data including bandwidth needs of a plurality of a plurality of historical user equipment devices previously connected to a base station supporting multiple component carriers. The training data includes historical carrier aggregation schemes assigned to the historical user equipment and historical spectral efficiency data of the base station. The method includes training, with a machine learning process using the training data, an analysis model to select carrier aggregation schemes for user equipment devices based on bandwidth needs.

DETAILED DESCRIPTION

Figure 1:
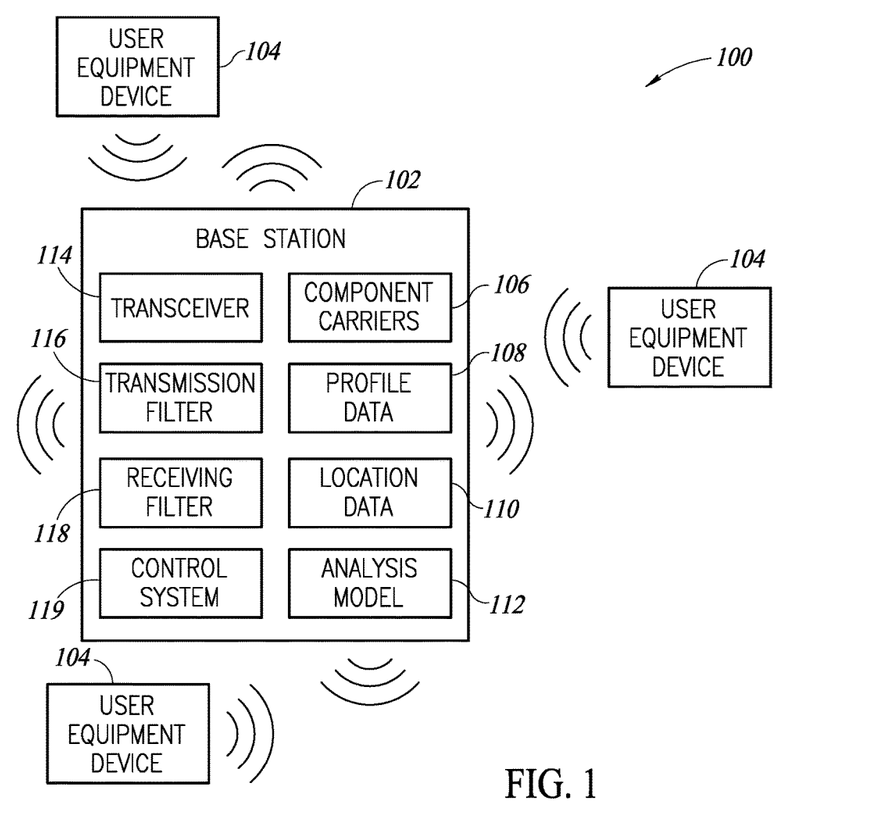
FIG. 1 is a block diagram of a wireless communication system, according to one embodiment.

FIG. 1 is a block diagram of a wireless communication system 100, according to one embodiment. The wireless communication system 100 includes a base station 102 and a plurality of user equipment devices 104. The base station 102 enables the user equipment devices 104 to communicate with other user equipment devices or to send and receive data via the Internet. As will be set forth in more detail below, the base station 102 selects carrier aggregation schemes for the user equipment devices 104 based on profile data 108 and location data 110.

User equipment devices 104 can include one or more of mobile phones, tablets, gaming devices, wearable smart devices, Internet of Things devices, and other types of devices. The user equipment devices 104 can include other types of devices without departing from the scope of the present disclosure.

The base station 102 includes a transceiver 114, a transmission filter 116, a receiving filter 118, and a control system 119. The transceiver 114 transmits mobile communication signals to the user equipment device 104, to other base stations, and to other communication systems to enable mobile communication and access to the Internet.

The control system 119 includes one or more computer readable media that store software instructions for establishing a mobile communication network with the base station 102. The control system 118 includes one or more processors configured to execute the instructions stored in one or more computer readable media.

In one embodiment, the communication system 100 is a 3GPP network. The communication system 100 can include a new radio (NR) fifth generation (5G) network. The communication system 100 can include other types of networks without departing from the scope of the present disclosure.

3GPP standards have defined specific bandwidths that can be utilized by 5G NR user equipment device. In particular, user equipment devices can utilize bandwidths of 5 MHz, 10 MHz, 15 MHz, 20 MHz, etc. 3GPP standards for 5G do not provide for user equipment devices utilizing bandwidths that are below 5 MHz or that are not multiples of 5 MHz.

Organizations and companies that wish to provide wireless communication network services typically purchase the rights to a particular portion of wireless spectrum. For example, 3GPP standards define a large number of evolved universal mobile telecommunications system (E-UTRA) bands in the radio frequency spectrum. Wireless service providers can purchase, license, or otherwise acquire bandwidth within one or more of these bands and can then provide mobile communication services within that portion of the band.

The base station 102 includes a plurality of component carriers 106. The component carriers can include bandwidth block of 5 MHz, 10, MHz, 15 MHz or 20 MHz, or sizes of frequency ranges as standards permit. In many cases, the component carriers are separated from each other in the frequency spectrum. The wireless communication system 100 utilizes carrier aggregation to promote high spectral efficiency. Carrier aggregation is a technique enabled in 3GPP standards that enables multiple component carriers to be assigned to the same user equipment device. The maximum possible data rate per user equipment device is increased the more component carriers are assigned to the user equipment device. Traditionally, three types of carrier aggregation have been utilized: intraband continuous carrier aggregation, intraband noncontiguous carrier aggregation, and interband carrier aggregation. Intraband contiguous carrier aggregation corresponds to a situation in which the component carriers are contiguous of each other, i.e. one component carrier begins where the other component carrier ends. Intraband noncontiguous carrier aggregations correspond to a situation in which component carriers are in the same frequency band but are separated by a gap. Interband carrier aggregation corresponds a situation in which the component carriers lie in different frequency bands.

In one embodiment, in order to comply with 3GPP channel bandwidth, the base station 102 will be configured as a channel having a bandwidth that is the sum of the bandwidths of all of the component carriers. In one embodiment, the base station 102 includes a transmission filter 116. The transmission filter 116 is a bandpass filter with a strict passband. The passband corresponds to the bandwidth that is assigned for the base station 102. Any signals with frequencies outside the passband are filtered so that they are not transmitted from the base station 102. This can help ensure that transmissions from the base station 102 do not infringe on bandwidth assigned to adjacent networks, while meeting the out of band emissions.

In one embodiment, the base station 102 includes a receiving filter 118. The receiving filter 118 is configured to ensure that the base station 102 will reject any signals outside of its designated bandwidth. Accordingly, the receiving filter 118 is a bandpass filter with a strict passband corresponding to the assigned bandwidth of the communication system 100. Thus, communications from networks in neighboring bandwidths will not be received by the base station 102.

When large numbers of user equipment devices 104 are connected to the mobile communication network established by the base station 102, even with carrier aggregation it can be difficult to ensure a high spectral efficiency. For a given mobile communications network, there is a theoretical maximum transmission bit rate based on the amount of bandwidth available and how many bits per second can be transmitted, in both uplink and downlink, for a given amount of bandwidth. Spectral efficiency corresponds to how much of the bandwidth is utilized.

In one embodiment, the base station 102 improves spectral efficiency by assigning carrier aggregation schemes to individual user equipment devices 104 by dynamically assigning carrier aggregation schemes to individual user equipment devices based on selected criteria. Details regarding the selected criteria will be provided further below. The dynamic assignment of carrier aggregation schemes to individual user equipment devices 104 can greatly improve spectral efficiency of the base station 102.

The base station 102 may support multiple component carriers 106 in particular frequency ranges. However, an individual user equipment device 104 may or may not support using multiple component carriers. Some user equipment devices 104 may only support communication on a single component carrier. Some user equipment devices may support simultaneously using multiple component carriers. Some user equipment devices may only support multiple component carriers in particular frequency ranges.

When the base station 102 establishes a network connection with the user equipment device 104, the base station 102 requests the carrier aggregation capabilities of the user equipment device 104. The user equipment device 104 responds by indicating whether or not the user, device 104 is capable of carrier aggregation. The user equipment device 104 may indicate the maximum number of component carriers that can be utilized by the user equipment device 104. The user equipment device 104 may also indicate the frequency bands supported by the user equipment device 104 in carrier aggregation.

After the base station 102 receives the carrier aggregation capability information from the user equipment device 104, the base station 102 assigns a carrier aggregation scheme to the user equipment device 104. The carrier aggregation scheme can include assigning all of the available component carriers to the user equipment device 104, multiple component carriers but not all available component carriers, or only a single component carrier. The base station 102 can make this assignment based on the carrier aggregation capabilities of the user equipment device 104 as well as other factors, as will be described in more detail below.

A carrier aggregation scheme will indicate which component carrier is the primary component carrier in which component carriers are secondary component carriers for a user equipment device 104. A user equipment device 104 will primarily utilize the primary component carrier for data transmission and reception. If the primary component carrier does not, by itself, satisfy the data transmission requests of the user equipment device 104, then the user equipment device 104 can utilize the additional component carriers assigned to it in the carrier aggregation scheme. If no secondary component carriers are made available by the base station 102 to the user equipment device 104, then all data transmission will occur on the primary component carrier.

In one embodiment, the base station 102 assigns carrier aggregation schemes to the user equipment devices 104 based on the locations of the user equipment devices 104. Each component carrier has a particular frequency range. In general, component carriers do not have overlapping frequency range. Some component carriers' frequency ranges may be separated from each other by hundreds of MHz. In general, signals with lower frequencies travel farther than signals with higher frequencies without dissipating. A user equipment device 104 that is farther from the base station 102 may benefit from utilizing a component carrier in a lower frequency band, whereas a user equipment device 104 that is near the base station may benefit from utilizing a component carrier in a higher band. Accordingly, the base station 102 can assign component carriers to individual user equipment devices 104 based on the locations of the user equipment devices 104.

In one example, the base station 102 supports two component carriers. The base station 102 may assign to a relatively distant user equipment device 104 a carrier aggregation scheme in which the primary component carrier is the lower frequency component carrier and the secondary component carrier is the higher frequency component carrier. The base station 102 may assign to a relatively nearby user equipment device 104 a carrier aggregation scheme in which the higher frequency component carrier is the primary component carrier and the secondary component carrier is the lower frequency component carrier. This can improve the overall spectral efficiency of the base station 102. Alternatively, the base station 102 may assign carrier aggregation schemes in which both user equipment devices 104 are able to use only a single component carrier.

In one embodiment, the base station 102 dynamically adjusts carrier aggregation schemes assigned to user equipment devices 104 based on changing location distributions of the user equipment devices. From moment to moment, the number of connected user equipment devices 104, and the distribution of distances from the base station 102 may change. Initially, there may be a small number of user equipment devices 104 that are near the base station 102 and a small number of user equipment devices 104 that are distant from the base station 102. The base station 102 may initially assign only a higher frequency component carrier to the user equipment devices 104 that are near the base station 102. However, after some amount of time there may be a larger number of user equipment devices 104 near the base station 102. In this case, the base station 102 may assign to one or more of the user equipment devices 104 carrier aggregation schemes in which a lower frequency component carrier is made available as a secondary component carrier. This may improve the spectral efficiency of the base station 102. Likewise, the base station 102 may adjust carrier aggregation schemes for one or more user equipment devices 104 that are distant from the base station 102 in a similar manner.

The base station 102 may obtain location data 110 associated with a user equipment device 104 in various ways. In some cases, the base station 102 may request location data 110 from user equipment device 104. The base station 102 may provide location data 110 to the base station 102 including GPS coordinates of the user equipment device 104.

In one example, the base station 102 may request location data 110 from the user equipment device 104 and the user equipment device 104 may not have GPS coordinates or other location data. In this case, the base station 102 may request that the user equipment device 104 outputs a reference signal that is received by the base station 102 and multiple other base stations. The other base stations record timestamp indicating the time that the reference signal was received. The other base stations pass these timestamps to the base station 102. The base station 102 then calculates the location of the user equipment device 104 based on the timestamps and no locations received from the other base stations.

The base station 102 may obtain location data 110 from each connected user equipment device 104 periodically. For example, the base station 102 may obtain new location data 110 are each connected user equipment device every minute, several times per minute, or at other intervals so that the base station 102 can continuously update carrier aggregation schemes for the various user equipment devices 104.

In one embodiment, the base station 102 may receive a hand off for a particular user equipment device 104 from a nearby base station. In other words, the user equipment device 104 may initially be connected to a base station near the base station 102. As the user equipment device 104 travels closer to the base station 102, a hand off may occur so that the base station 102 connects to the user, device 104. During this hand off, the other base station may indicate the current carrier aggregation scheme assigned to user equipment device 104. The base station 102 may elect to maintain the same carrier aggregation scheme or may elect to change the carrier aggregation scheme based on current conditions.

In one embodiment, the base station 102 obtains profile data 108 associated with each user equipment device 104 currently connected to the base station 102. The profile data 108 indicates the current data transmission needs or requests of the user equipment device 104. The base station 102 selects, for each user equipment device connected to the base station 102, a carrier aggregation scheme based on the profile data 108 of all of the user equipment devices 104 currently connected to the base station 102.

In one embodiment, the profile data 108 for a user equipment device 104 indicates both the uplink and downlink data needs of the user equipment device 104. The base station 102 selects carrier aggregation schemes for the user equipment devices 104 based on the uplink and downlink data needs or requests of the user equipment devices 104. The base station 102 selects a combination of carrier aggregation schemes to promote high spectral efficiency.

In one example, some users may have heavy data utilization on the downlink direction unless data utilization on the uplink direction. The base station 102 may provide carrier aggregation schemes for the various user equipment devices 104 that provide more bandwidth on the downlink direction to boost downlink throughputs. For user equipment devices with heavy utilization on the uplink channels and less traffic on the downlink channels, the base station 102 may provide carrier aggregation schemes that combine more bandwidth on the uplink direction to boost uplink throughputs. This can lead to better user experiences.

The base station 102 can dynamically adjust carrier aggregation schemes based on changing conditions of the mobile communication network. For example, data uplink and downlink utilization may vary from moment to moment for the various user equipment devices 104. Furthermore, the number of user equipment devices 104 that are connected to the base station 102 can change from moment to moment. The base station 102 can dynamically adjust carrier aggregation schemes for the user equipment devices 104 based on the current profile data 108 of the currently connected user equipment devices 104.

The base station 102 can obtain the profile data 108 for each user equipment device 104 by analyzing the current fit rate utilization or requested bit rate utilization of the user equipment device 104. Because all transmitted data on the mobile communication network goes to the base station 102, the base station 102 can know at all times the data needs or requests of each user equipment device 104.

In one embodiment, the base station 102 maintains an analysis model 112. The analysis model 112 can include an algorithm or other type of model that determines carrier aggregation schemes for each of the user equipment devices 104. The analysis model can determine the carrier aggregation schemes based on the number of currently connected user equipment devices 104, the location data 110 associated with each user equipment device 104, and the profile data 108 of each user equipment device 104.

One embodiment, the base station 102, or another system in communication with the base station 102, generates the analysis model 112 with a machine learning process. The machine learning process can include assigning carrier aggregation schemes to user equipment devices 104 in accordance with one or both of the location data 110 and the profile data 108 (as per use case) and determining the spectral efficiency for each distribution of carrier aggregation schemes. The machine learning process can utilize this data as training data. The spectral efficiency can be determined for a large number of distributions of carrier aggregation schemes. The machine learning process can determine the distribution carrier aggregation schemes that results in high spectral efficiencies for various sets of location data profile data. After the machine learning processes train the analysis model 112, the analysis model 112 can use one or both of location data 110 profile data 108 of each currently connected the user equipment device 104 as inputs in order to generate carrier aggregation schemes for each user equipment device 104. Further details regarding the machine learning process are provided in relation to FIG. 3.

Figure 2A:
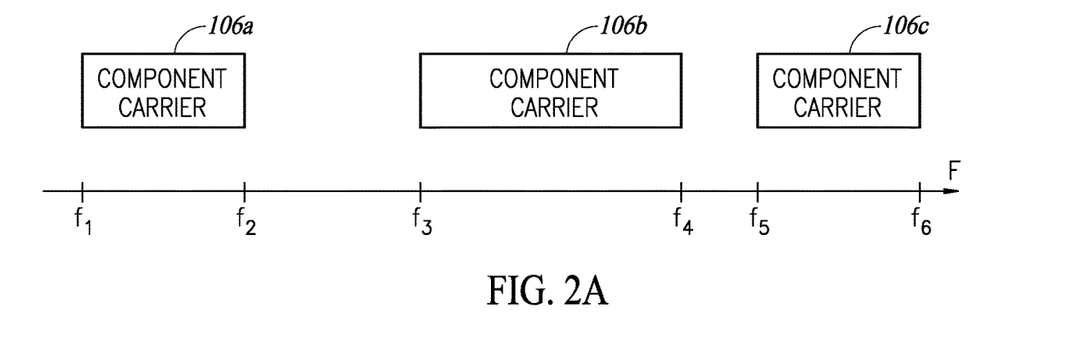
FIG. 2A is a representation of component carriers in a frequency spectrum, according to one embodiment.
Figure 3:
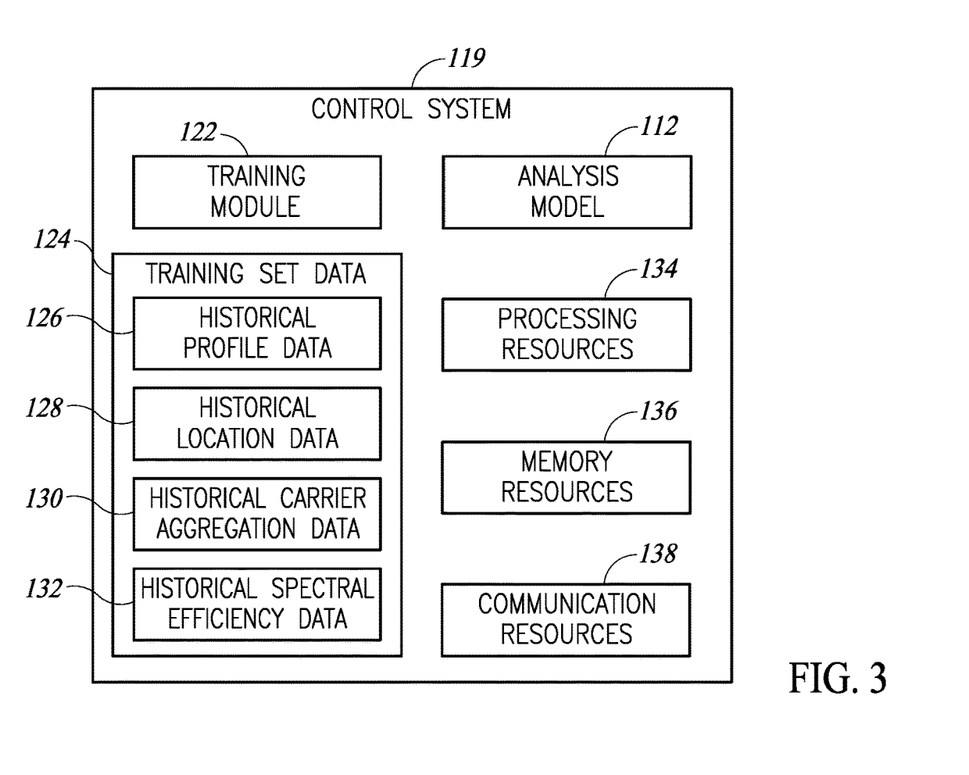
FIG. 3 is a block diagram of a base station, according to one embodiment.

FIG. 2A is a graph illustrating multiple component carriers supported by a base station 102, according to one embodiment. In the example of FIG. 3, a first component carrier 106a has a frequency band between frequencies f1 and f2. A second component carrier 106b has a frequency band between frequencies f3 and f4. A third component carrier 106c has a frequency band between frequencies f5 and f6.

In one example, the component carriers 106a and 106c each have a same amount of bandwidth, though in different frequency ranges. The component carrier 106b has a larger amount of bandwidth than the component carriers 106a and 106c. In one example, the component carriers 106a and 106c each have a 5 MHz bandwidth and the component carrier 106b has a bandwidth of 10 MHz. The component carriers 106a-c can have other bandwidths without departing from the scope of the present disclosure.

Though not shown in FIG. 2A, in one example, two or more of the component carriers can be contiguous with each other. In this case, the frequency range one component carrier begins at the end of the frequency of another component carrier. There are various possible distributions of component carriers.

While FIG. 2A illustrates three component carriers 106a-c, in practice, the base station 102 may support to component carriers or more than three component carriers. Various numbers of component carriers can be utilized by the base station 102 without departing from the scope of the present disclosure.

Figure 2B:
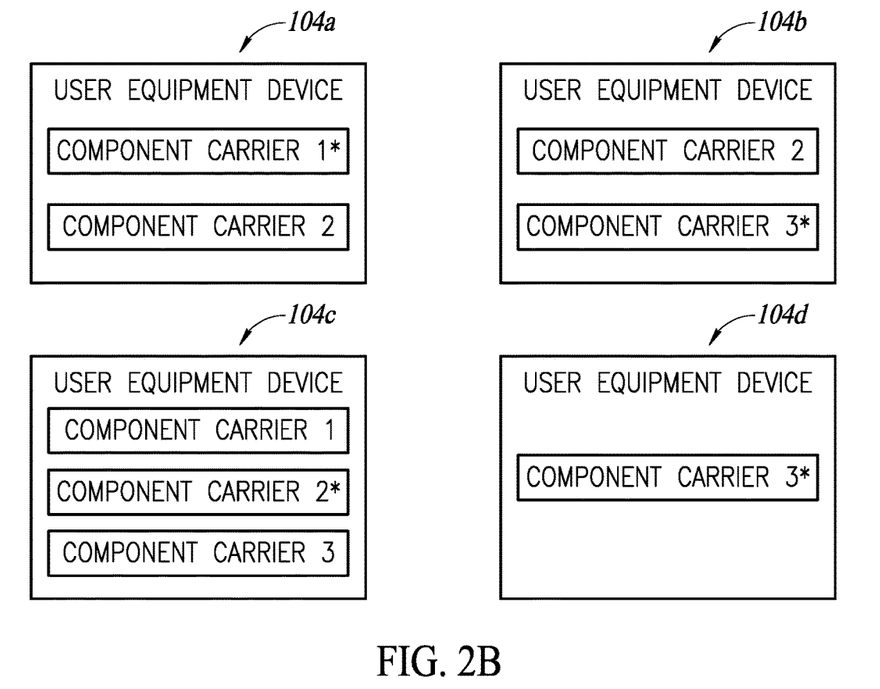
FIG. 2B is a representation of carrier aggregation schemes assigned to user equipment devices in a mobile communications network, according to one embodiment.

FIG. 2B illustrates carrier aggregation schemes assigned to each of four user equipment devices 104a-d, according to one embodiment. In the example of FIG. 2B, the base station 102 supports the three component carriers shown in FIG. 2A. In the illustrated carrier aggregation schemes, the asterisk indicates the primary component carrier in the carrier aggregation scheme. The other component carriers in a carrier aggregation scheme are secondary component carriers.

In the example of FIG. 2B, the base station 102 has signed a carrier aggregation scheme to the user equipment device 104a in which the first component carrier is the primary component carrier and the second component carrier is a secondary component carrier. The base station 102 has assigned the carrier aggregation scheme to the user equipment device 104b in which the third component carrier is the primary component carrier and the second component carrier is the secondary component carrier. The base station 102 has assigned a carrier aggregation scheme to the user equipment device 104c in which the second component carrier is the primary component carrier and the first and third component carriers are secondary component carriers. The base station 102 has assigned the carrier aggregation scheme to the user equipment device 104d in which only the third component carrier is made available. Accordingly, the third component carrier is the primary component carrier for the user equipment device 104d and no secondary component carriers are signed.

FIG. 3 is a block diagram of the base station 102, according to one embodiment. The block diagram of the base station 102 indicates data and assets of the base station 102 that may participate in generating an analysis model 120. Although the various data and resources are shown as part of the base station 102, in practice, another computing system can include the data and resources and to generate the analysis model 120 and provide the analysis model to the base station 102. Furthermore, the various data and resources can be distributed among the various computing systems.

FIG. 3 is a block diagram of the control system 119 of a base station 102, according to one embodiment. The control system 119 is one example of the control system 119 of the base station 102 of FIG. 1. The control system 119 is configured to generate an analysis model 112, according to one embodiment. The analysis model 112 of FIG. 3 is one example of the analysis model 112 of FIG. 1. The control system 119 utilizes the analysis model to dynamically select and adjust carrier aggregation schemes for user equipment devices 104 connected to a base station 102.

In one embodiment, the control system 119 includes an analysis model 112 and a training module 122. The training module 122 trains the analysis model 112 with a machine learning process. The machine learning process trains the analysis model 112 to select carrier aggregation schemes for connected user equipment devices 104 that will result in high spectral efficiency. Although the training module 122 is shown as being separate from the analysis model 112, in practice, the training module 122 may be part of the analysis model 112. The control system 119 can train the analysis model 112 with new user data regularly.

The control system 119 includes, or stores, training set data 124. The training set data 124 includes historical profile data 126, historical location data 128, historical carrier aggregation data 130, and historical spectral efficiency data 132. The historical profile data corresponds to profile data associated with user equipment devices connected to the base station 102 in the past. The historical location data 128 corresponds to location data associated with user equipment devices 104 connected to the base station 102 in the past. The historical carrier aggregation data 130 corresponds to carrier aggregation schemes that were assigned to the user equipment devices 104 associated with the historical location data 128 and the historical carrier aggregation data 130. The historical spectral efficiency data 132 corresponds to spectral efficiency measurements associated with the historical carrier aggregation schemes. The training module 122 utilizes the training set data 124 to train the analysis model 112 with a machine learning process to learn to select carrier aggregation schemes that results in high spectral efficiencies based on one or both of profile data 108 and location data 110.

In one embodiment, the historical profile data 126, the historical location data 128, the historical carrier aggregation data 130, and the historical spectral data 132 are arranged in sets. For example, a first set of historical profile data 126, historical location data 128, historical carrier aggregation data 130, and historical spectral efficiency data 132 may be gathered or measured for a second time period. For example, a second set of historical profile data 126, historical location data 128, historical carrier aggregation data 130, and historical spectral efficiency data 132 may be gathered or measured for a second time period. A large number of sets of these data may be gathered for large number of periods of time. Each of the steps, the historical carrier aggregation schemes are different from each other so that a large variety of historical carrier aggregation schemes are utilized in the training set data 124.

In an initial portion of the machine learning process, the various sets of historical profile data 126, historical location data 128, and historical carrier aggregation data 130 are used as inputs, while the historical spectral efficiency data 132 is used as labels. During this initial portion of the machine learning process, the analysis model 112 is trained through iterations to predict the historical spectral efficiencies based on the historical profile data 126, the historical location data 128, and the historical carrier aggregation data 130. During a second portion of the machine learning process, the analysis model 112 is trained to generate distributions of carrier aggregation schemes that will result in high spectral efficiencies based on historical profile data 126 and historical location data 128.

In one embodiment the analysis model 112 includes a neural network. However, other types of analysis models or algorithms can be used without departing from the scope of the present disclosure. The training module 122 utilizes the training set data 124 to train the neural network with a machine learning process. During the training process, the neural network receives, as input, the historical profile data 126, the historical location data 128, and the historical carrier aggregation data 130. During the training process, the neural network outputs predictions of spectral efficiency based on the training data. The training process also trains the neural network to generate carrier aggregation scheme distributions that will result in high spectral efficiencies.

In one embodiment, the neural network includes a plurality of neural layers. Each neural layer includes internal functions. The internal functions include weighting values associated with the neural layer of the neural network. During training, the control system 119 compares, for each set of historical profile data 126, historical location data 128, and historical carrier aggregation data 130, the predicted spectral efficiency and compares the predicted spectral efficiency with the actual historical spectral efficiency values. The control system generates an error function indicating how closely the predicted spectral efficiency values match the historical spectral efficiency values. The control system 119 then adjusts the internal functions of the neural network. Because the neural network generates predicted structural efficiency data based on the internal functions, adjusting the internal functions will result in the generation of different predicted spectral efficiency data for a same set of historical profile, location, and carrier aggregation data. Adjusting the internal functions can result in smaller or larger error values.

After adjusting the internal functions of the neural network, the historical profile data, location data and the carrier aggregation data is again passed to the neural network and the analysis model 112 again generates predicted spectral efficiency data. The training module 122 again compares the predicted spectral efficiency data to the historical spectral efficiency data. The training module 122 again adjusts the internal functions of the neural network. This process is repeated in a very large number of iterations of monitoring the error functions and adjusting the internal functions of the neural network until a set of internal functions is found that results in predicted spectral efficiency data that matches the historical spectral efficiency data 132.

In one embodiment, the analysis model 112 includes two neural networks coupled together in an encoder decoder configuration. The encoder neural network is trained with the training process described above to generate predicted spectral efficiencies. The decoder network is trained to receive the predicted spectral efficiencies and to reproduce the historical carrier aggregation data 130 that resulted in the predicted historical spectral efficiencies.

The training of the decoder neural network is similar to the training of the encoder neural network. The decoder neural networks includes a plurality of neural layers as described above in relation to the encoder neural network.

The decoder neural network receives as inputs a spectral efficiency value and historical profile location data and generates as output historical carrier aggregation data. The training process utilizes the historical carrier aggregation data 130 as labels. For each spectral efficiency value, the decoder neural network generates predicted carrier aggregation data. The predicted carrier aggregation data is compared to the historical carrier aggregation data and an error function is generated. The internal functions of the decoder neural network are adjusted in iterations until the decoder neural network can generate predicted carrier aggregation data carrier data that historical carrier aggregation data 130 within an error tolerance.

In one embodiment, after the analysis model 112 has been trained, the analysis model 112 can be utilized to generate sets of carrier aggregation schemes that will result in high spectral efficiencies. For example, current profile data 108 and/or location data 110 of the user equipment devices 104 currently connected to the base station 102, as well as a desire high spectral efficiency value are provided to the decoder as inputs. The decoder neural network generates carrier aggregation schemes that will result in the high spectral efficiency value based on the profile data 108 and the location data 110. The base station 102 can then assign carrier aggregation schemes to each of the currently connected user equipment devices.

In one embodiment, the control system 119 includes processing resources 134, memory resources 136, and communication resources 138. The processing resources 134 can include one or more controllers or processors. The processing resources 134 are configured to execute software instructions, process data, make carrier aggregation scheme decisions, perform signal processing, read data from memory, write data to memory, and to perform other processing operations. The processing resources 134 can include physical processing resources 134 located at the base station 102. The processing resources can include virtual processing resources 134 remote from the base station 102. The processing resources 134 can include cloud-based processing resources including processors and servers accessed via one or more cloud computing platforms.

In one embodiment, the memory resources 136 can include one or more computer readable memories. The memory resources 136 are configured to store software instructions associated with the function of the control system and its components, including, but not limited to, the analysis model 112. The memory resources 136 can store data associated with the function of the control system 119 and its components. The data can include the training set data 124, current process conditions data, and any other data associated with the operation of the control system 119 or any of its components. The memory resources 136 can include physical memory resources located at the base station 102. The memory resources can include virtual memory resources located remotely from base station 102. The memory resources 136 can include cloud-based memory resources accessed via one or more cloud computing platforms.

In one embodiment, the communication resources 138 can include resources that enable the control system 119 to communicate with components of the base station 102. For example, the communication resources 138 can include wired and wireless communication resources that enable the control system 119 to communicate with components of the base station 102 or with other systems. In one embodiment, the analysis model 112 is implemented via the processing resources 134, the memory resources 136, and the communication resources 138. The control system 119 can be a dispersed control system with components and resources and locations remote from each other and from base station 102.

Figure 4:
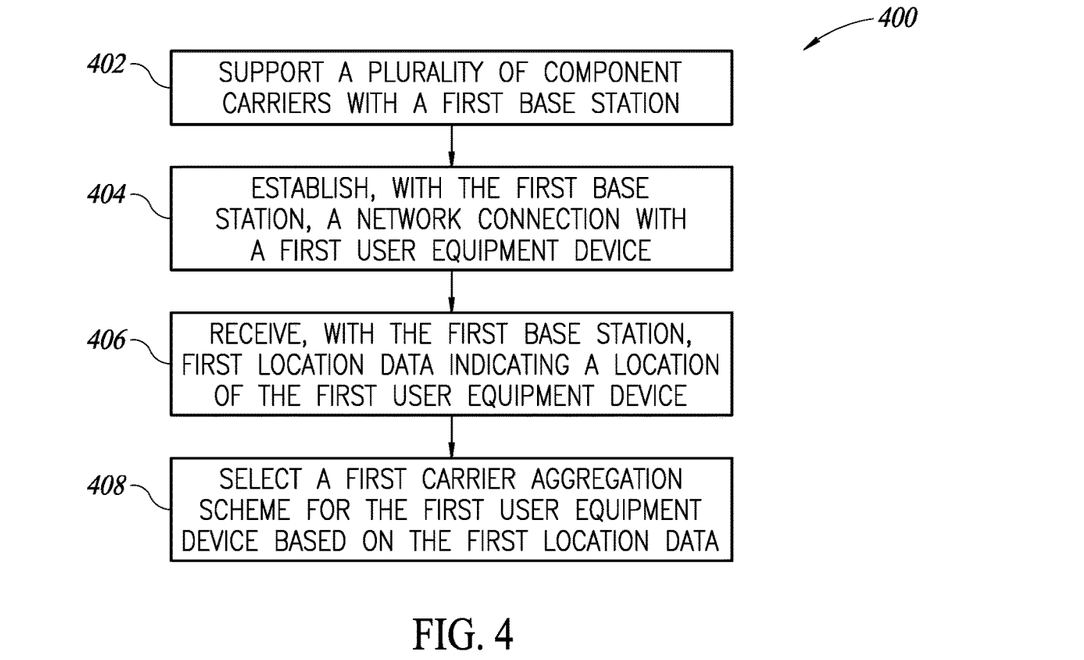
FIG. 4 is a flow diagram of a method for operating a mobile communication network base station, according to one embodiment.

FIG. 4 is a flow diagram of a method 400 for operating a base station, in accordance with some embodiments. The method 400 can utilize the systems, components, and processes described in relation to FIGS. 1-3. At 402, the method 400 includes supporting a plurality of component carriers with a first base station. At 404, the method 400 includes establishing, with the first base station, a network connection with a first user equipment device. At 406, the method 400 includes receiving, with the first base station, first location data indicating a location of the first user equipment device. At 408, the method 400 includes selecting a first carrier aggregation scheme for the first user equipment device based on the first location data.

Figure 5:
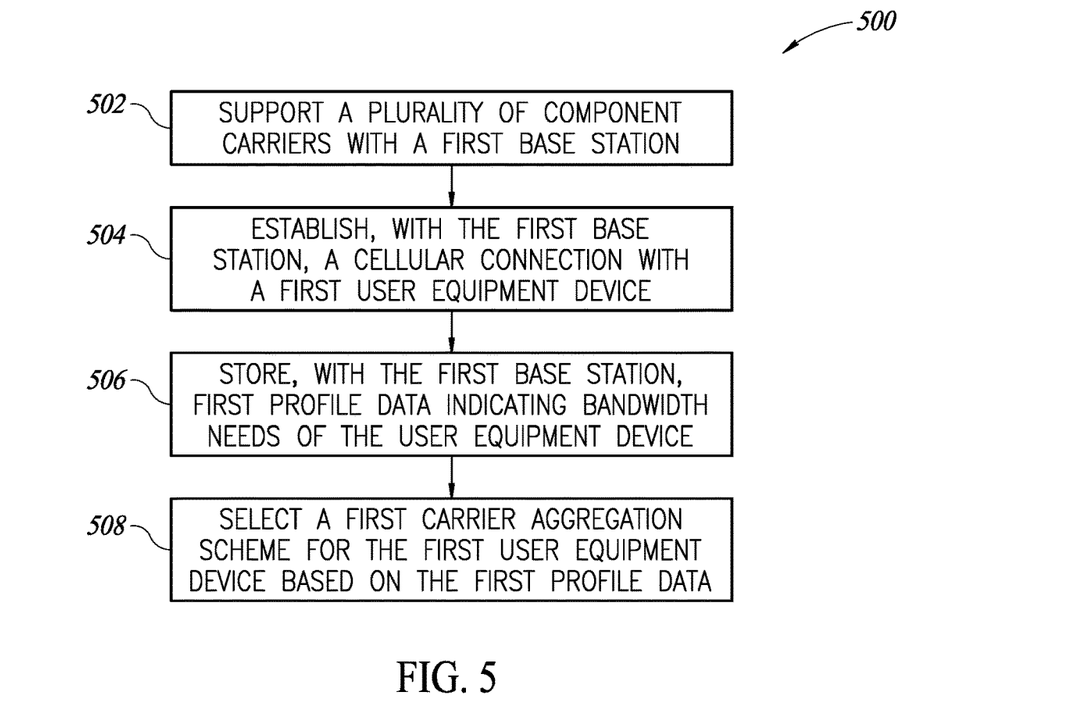
FIG. 5 is a flow diagram of a method for operating a mobile communication network base station, according to one embodiment.

FIG. 5 is a flow diagram of a method 500 for operating a base station, in accordance with some embodiments. The method 500 can utilize the systems, components, and processes described in relation to FIGS. 1-3. At 502, the method 500 includes supporting a plurality of component carriers with a first base station. At 504, the method 500 includes establishing, with the first base station, a cellular connection with a first user equipment device. At 506, the method 500 includes storing, with the first base station, first profile data indicating bandwidth needs of the user equipment device. At 508, the method 500 includes selecting a first carrier aggregation scheme for the first user equipment device based on the first profile data.

Figure 6:
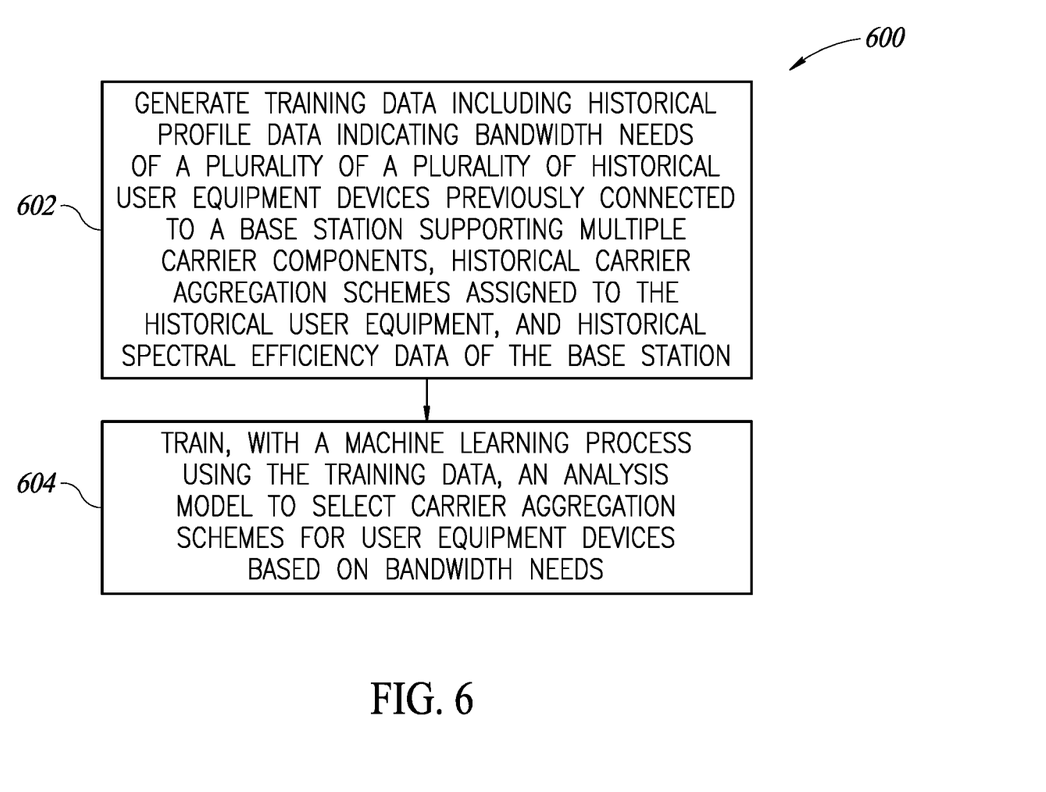
FIG. 6 is a flow diagram of a method for operating a mobile communication network base station, according to one embodiment.

FIG. 6 is a flow diagram of a method 600 for training an analysis model for a base station, in accordance with some embodiments. The method 600 can utilize the systems, components, and processes described in relation to FIGS. 1-3. At 602, the method 600 includes storing training data. The training set data includes historical profile data including bandwidth needs of a plurality of a plurality of historical user equipment devices previously connected to a base station supporting multiple component carriers. The training set data includes historical carrier aggregation schemes assigned to the historical user equipment. The training set data includes historical spectral efficiency data of the base station. At 604, the method 600 includes training, with a machine learning process using the training data, an analysis model to select carrier aggregation schemes for user equipment devices based on bandwidth needs.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
supporting a plurality of component carriers with a first base station;
establishing, with the first base station, network connections with a first user equipment device and a second user equipment device;

storing, with the first base station, first profile data indicating first uplink and downlink bandwidth needs of the first user equipment device;
storing, with the first base station, second profile data indicating second uplink and downlink bandwidth needs of the second user equipment device;
receiving, with the first base station, first location data indicating a location of the first user equipment device; and
selecting a first carrier aggregation scheme for the first user equipment device based on the first location data and the first uplink and downlink bandwidth needs in the first profile data of the first user equipment device relative to the second uplink and downlink bandwidth needs in the second profile data of the second user equipment device, including:
  selecting, for the first user equipment device, a first component carrier having a first frequency band if a distance between the first user equipment device and the first base station is greater than a threshold distance; and
  selecting, for the first user equipment device, a second component carrier having a second frequency band higher than the first frequency band if the distance is less than the threshold distance.

2. The method of claim 1, wherein selecting the first carrier aggregation scheme includes selecting a subset of the component carriers for the first user equipment device based on the first location data.

3. The method of claim 1, comprising:
establishing, with the first base station, network connections with a plurality of second user equipment devices;
receiving, with the first base station, second location data indicating locations of the second user equipment devices; and
selecting the first carrier aggregation scheme for the first user equipment device based on the first location data and the second location data.

4. The method of claim 1, wherein receiving the first location data includes receiving GPS data associated with the first user equipment device.

5. The method of claim 1, wherein receiving the location data includes receiving a reference signal from the first user equipment device and performing triangulation with the first base station and multiple second base stations based on the reference signal.

6. The method of claim 1, wherein selecting the first component carrier includes:
assigning the first component carrier as a primary carrier for the first user equipment device; and
assigning the second component carrier as a secondary carrier for the first user equipment device.

7. The method of claim 1, wherein selecting the second component carrier includes:
assigning the second component carrier as a primary carrier for the first user equipment device; and
assigning the first component carrier as a secondary carrier for the first user equipment device.

8. A method, comprising:
supporting a plurality of component carriers with a first base station;
establishing, with the first base station, cellular connections with a first user equipment device and a second user equipment device;
storing, with the first base station, first profile data indicating bandwidth needs of the first user equipment device, wherein the first profile data includes first uplink bandwidth needs and first downlink bandwidth needs of the first user equipment device;
storing, with the first base station, second profile data indicating bandwidth needs of the second user equipment device, wherein the second profile data includes second uplink bandwidth needs and second downlink bandwidth needs of the second user equipment device;
selecting a first carrier aggregation scheme for the first user equipment device based on the first uplink bandwidth needs in the first profile data of the first user equipment device being greater than the second uplink bandwidth needs in the second profile data of the second user equipment device; and
selecting a second carrier aggregation scheme for the second user equipment device based on the second uplink bandwidth needs in the second profile data of the second user equipment device being greater than the first downlink bandwidth needs in the first profile data of the first user equipment device, wherein the second carrier aggregation scheme is different from the first carrier aggregation scheme.

9. The method of claim 8, wherein selecting the first carrier aggregation scheme comprises:
selecting the first carrier aggregation scheme for the first user equipment device based on the first profile data and the second profile data.

10. The method of claim 9, wherein selecting the first carrier aggregation scheme comprises:
selecting the second carrier aggregation scheme for the second user equipment device based on the first profile data and the second profile data.

11. The method of claim 9, comprising:
wherein selecting the first carrier aggregation scheme for the first user equipment device is based on the first uplink bandwidth needs and the first downlink bandwidth needs of the first user equipment device and is based on the second uplink bandwidth needs and the second downlink bandwidth needs of the second user equipment device; and
wherein selecting the second carrier aggregation scheme for the second user equipment device is based on the first uplink bandwidth needs and the first downlink bandwidth needs of the first user equipment device and is based on the second uplink bandwidth needs and the second downlink bandwidth needs of the second user equipment device.

12. The method of claim 8, wherein the first profile data includes first location data indicating a location of the first user equipment device, wherein the second profile data includes second location data indicating a location of the second user equipment devices, wherein the method includes:
selecting the first carrier aggregation scheme based on the first location data and the second location data; and
selecting the second carrier aggregation schemes based on the first location data and the second location data.

* * * * *

UNITED STATES PATENT AND TRADEMARK OFFICE
CERTIFICATE OF CORRECTION

PATENT NO. : 12,317,117 B2
APPLICATION NO. : 17/752685
DATED : May 27, 2025
INVENTOR(S) : Dilip Tandekar et al.

It is certified that error appears in the above-identified patent and that said Letters Patent is hereby corrected as shown below:

In the Claims

Column 14, Claim 8, Lines 20-21:
"second uplink bandwidth" should read: --second downlink bandwidth--.

Column 14, Claim 12, Line 56:
"equipment devices," should read: --equipment device,--.

Signed and Sealed this
Twelfth Day of August, 2025

Coke Morgan Stewart
*Acting Director of the United States Patent and Trademark Office*